(12) United States Patent
Ajichi

(10) Patent No.: US 8,899,818 B2
(45) Date of Patent: Dec. 2, 2014

(54) BACKLIGHT UNIT INCLUDING LIGHT GUIDE AND GAP RETAINER

(75) Inventor: Yuhsaku Ajichi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/008,171

(22) PCT Filed: Mar. 26, 2012

(86) PCT No.: PCT/JP2012/057759
§ 371 (c)(1),
(2), (4) Date: Sep. 27, 2013

(87) PCT Pub. No.: WO2012/133312
PCT Pub. Date: Oct. 4, 2012

(65) Prior Publication Data
US 2014/0016355 A1 Jan. 16, 2014

(30) Foreign Application Priority Data
Mar. 31, 2011 (JP) .................................. 2011-078211

(51) Int. Cl.
*F21V 8/00* (2006.01)
*G02F 1/1335* (2006.01)
*G02F 1/1333* (2006.01)

(52) U.S. Cl.
CPC ........ *G02B 6/0091* (2013.01); *G02F 1/133615* (2013.01); *G02F 2001/133322* (2013.01); *G02B 6/0068* (2013.01)
USPC .......................................... 362/632; 362/633

(58) Field of Classification Search
USPC ........................................ 362/635, 632, 631
See application file for complete search history.

(56) References Cited

FOREIGN PATENT DOCUMENTS

| JP | 2001-118417 A | 4/2001 |
|----|---------------|--------|
| JP | 2006-185724 A | 7/2006 |
| JP | 2008-027736 A | 2/2008 |
| JP | 2009-277641 A | 11/2009 |

OTHER PUBLICATIONS

Hirashi, Japanese Patent Application Publication 2001-118417, Apr. 2001, machine translation.*
Official Communication issued in International Patent Application No. PCT/JP2012/057759, mailed on May 1, 2012.

* cited by examiner

*Primary Examiner* — Tracie Y Green
(74) *Attorney, Agent, or Firm* — Keating & Bennett, LLP

(57) ABSTRACT

A backlight unit includes a light source; a light guide; a gap retainer including two plate-like portions orthogonal to each other, the light guide being placed over a first plate-like portion of the two plate-like portions, the light source being attached to a side of a second plate-like portion of the two plate-like portions; a chassis including a frame-shaped side wall portion and a bottom portion, the gap retainer being positioned with respect to the chassis such that the second plate-like portion and the side wall portion face each other and the first plate-like portion and the bottom portion face each other; and an elastic body urging the gap retainer in a direction away from the side wall portion. The gap retainer includes a stopper to maintain a gap between the light source and the side edge surface of the light guide.

4 Claims, 3 Drawing Sheets

BACKLIGHT UNIT INCLUDING LIGHT GUIDE AND GAP RETAINER

TECHNICAL FIELD

The present invention relates to backlight units and particularly to backlight units adopting an edge lighting method.

BACKGROUND ART

As an example of existing literature, Japanese Unexamined Patent Application Publication No. 2008-27736 (PTL 1) discloses a backlight unit in which a light guide can be securely fixed to a chassis regardless of a change in temperature conditions. In the backlight unit described in PTL 1, a rectangular metal frame supports light emitting diodes (LEDs) and holds the light guide. The LEDs are attached to a side wall of the metal frame.

The metal frame is equipped with long-side ribs, which protrude from one long-side wall toward the opposite long-side wall, and a short-side rib, which protrudes from one short-side wall toward the opposite short-side wall. The long-side ribs and the short-side rib are attached to the metal frame such that they have spring characteristics. The long-side ribs press the light guide against the opposite long-side wall. The short-side rib presses the light guide against the opposite short-side wall.

CITATION LIST

Patent Literature

PTL 1: Japanese Unexamined Patent Application Publication No. 2008-27736

SUMMARY OF INVENTION

Technical Problem

The light guide is disposed adjacent to components such as the LEDs and other electronic components. Thus, the light guide is heated by heat generated during operations of the LEDs and other electronic components and thus thermally expands. In the backlight unit described in PTL 1, light sources, for which the LEDs are employed, are attached to a side wall of the metal frame and the light guide is fixed to the metal frame by being pressed by the ribs having spring characteristics. Thus, when the light guide thermally expands, the ribs may bend and the light guide and the light sources may come into contact with one another.

If the light guide and the light sources come into contact with one another, an optical path in the light guide through which light passes is partially changed because a difference in index of refraction at the interface between the light source and the light guide disappears in a portion at which the light guide and each light source come into contact with each other. Thus, light is unevenly emitted from the light guide. Furthermore, the light sources may be broken as a result of the light guide and the light sources coming into contact with one another.

The present invention was made in view of the above problems. An object of the present invention is to provide a backlight unit that can stably emit light from a light guide while maintaining a gap between the light guide and light sources.

Solution to Problem

A backlight unit according to the present invention includes a light source; a light guide disposed so as to be separated from the light source so that light from the light source is incident on a side edge surface of the light guide; and a gap retainer including two plate-like portions orthogonal to each other so as to have an L-shaped cross section, the light guide being placed over a first plate-like portion of the two plate-like portions, the light source being attached to a side of a second plate-like portion of the two plate-like portions. The backlight unit also includes a chassis including a frame-shaped side wall portion and a bottom portion, the gap retainer being positioned with respect to the chassis such that the second plate-like portion and the side wall portion face each other and the first plate-like portion and the bottom portion face each other; and an elastic body disposed between the side wall portion and the second plate-like portion, the elastic body urging the gap retainer in a direction away from the side wall portion. The gap retainer includes a stopper formed on an upper surface of the first plate-like portion, the stopper being constantly in contact with part of the side edge surface of the light guide due to being pressed by the elastic body to maintain a gap between the light source and the side edge surface of the light guide.

Preferably, the gap retainer is made of one metal sheet.

In an aspect of the present invention, the elastic body is a spring. In another aspect of the present invention, the elastic body is a rubber piece.

Preferably, the gap retainer is provided in a plurality and the plurality of gap retainers are disposed so as to be in contact with two opposite side edge surfaces of the light guide.

Advantageous Effects of Invention

The backlight unit according to the present invention can stably emit light from a light guide while maintaining a gap between the light guide and light sources.

DESCRIPTION OF EMBODIMENTS

Now, a backlight unit according to a first embodiment of the present invention will be described below. In the following description of the embodiment, the same or similar components are denoted by the same reference symbols throughout the drawings and those components are not repeatedly described. For convenience of description, the embodiment will be described by using the terms up, down, right, and left, which are used in relation to the drawings and are not intended to limit the configuration of the present invention.

(First Embodiment)

Figure 1:
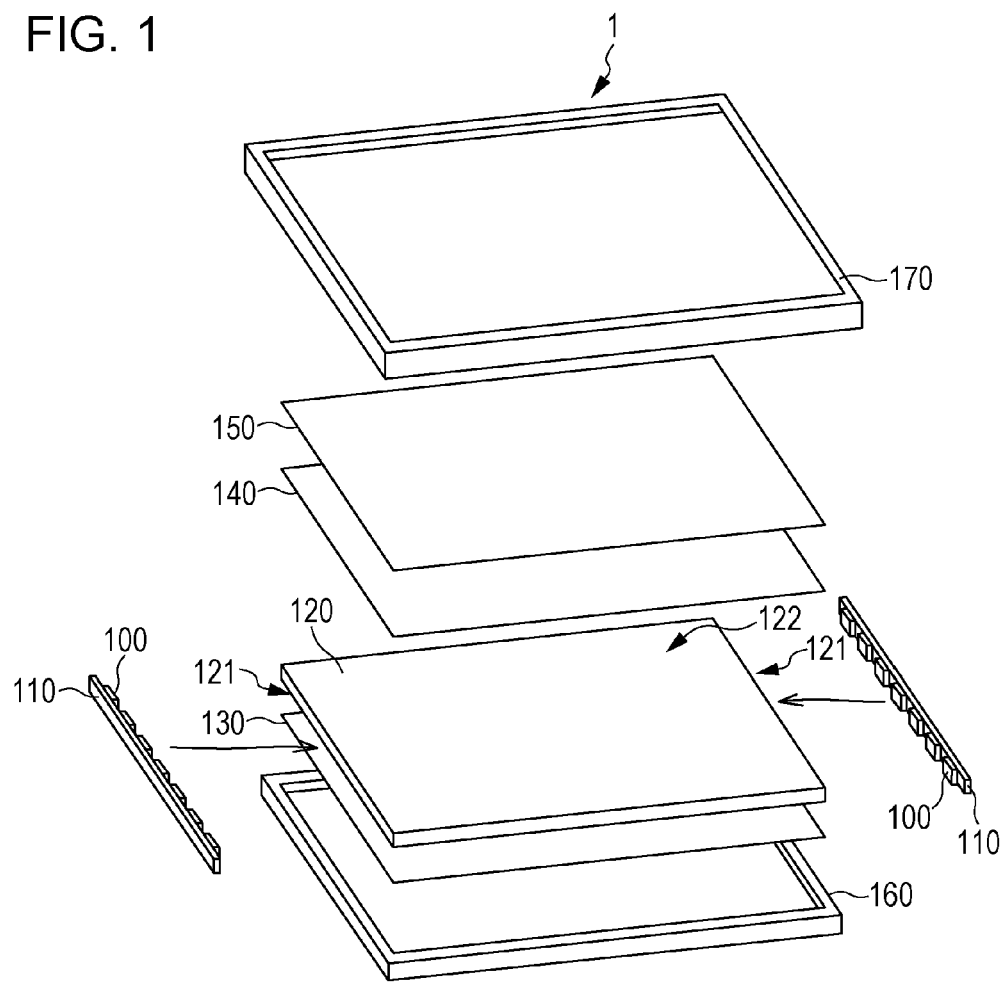
FIG. 1 is an exploded perspective view illustrating a configuration of a liquid crystal display device.
Figure 2:
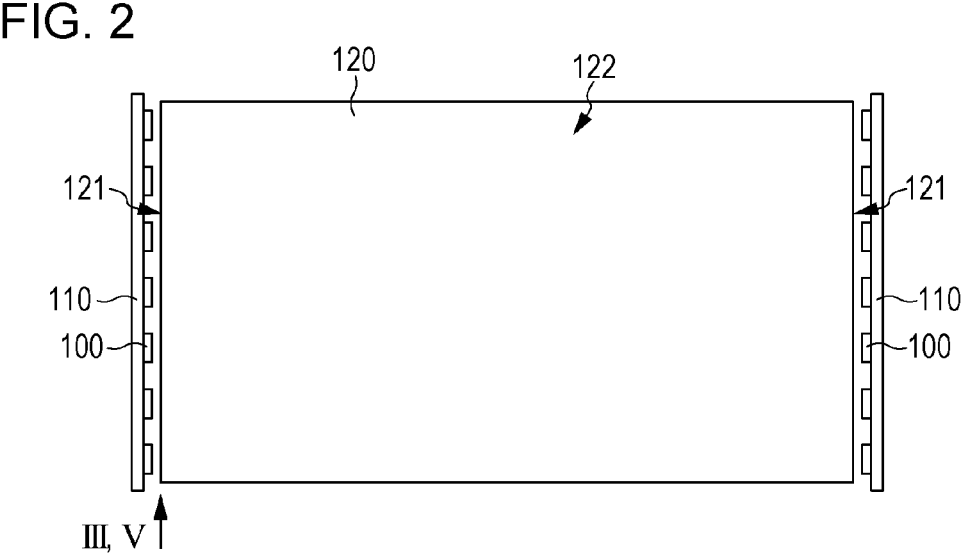
FIG. 2 is a plan view illustrating an arrangement of a light guide and light sources in a backlight unit according to a first embodiment of the present invention.

FIG. 1 is an exploded perspective view illustrating a configuration of a liquid crystal display device. FIG. 2 is a plan view illustrating an arrangement of a light guide and light sources in a backlight unit according to a first embodiment of the present invention. FIGS. 1 and 2 do not illustrate gap retainers and elastic bodies, which will be described below.

As illustrated in FIG. 1, a liquid crystal display device 1 includes a bezel 170, a chassis 160, a reflection sheet 130, a light guide 120, a group 140 of multilayered sheets, a liquid crystal display panel 150, LEDs 100, and circuit boards 110. The LEDs 100 serve as light sources. The reflection sheet 130, the light guide 120, the group 140 of multilayered sheets, and the liquid crystal display panel 150 are stacked in this order from the bottom between the bezel 170 and the chassis 160.

In this embodiment, LEDs 100 are employed as the light sources, but the light sources are not limited to the LEDs and fluorescent lights or other light sources may be employed as the light sources, instead.

The reflection sheet 130 is made of, for example, polyester. For example, the reflection sheet 130 is made of PET (polyethylene terephthalate) foam and has light reflecting characteristics. The reflection sheet 130 has a function of reflecting light that has leaked from the back surface of the light guide 120 back into the light guide 120.

The group 140 of multilayered sheets includes a diffusion sheet and a prism sheet. The group 140 of multilayered sheets has functions of reducing unevenness in luminance of light emitted from the light guide 120, gathering light emitted from the light guide 120, and emitting the light toward the liquid crystal display panel 150.

The liquid crystal display panel 150 includes an active matrix board, a color filter, an opposite board, and a liquid crystal enclosed between the active matrix board and the opposite board. The active matrix board includes multiple thin film transistor (TFT) elements. The liquid crystal display panel 150 displays images by using light that has passed through the group 140 of multilayered sheets and then has been incident on the liquid crystal display panel 150.

The bezel 170 includes a window portion through which a display area of the liquid crystal display panel 150 is visually perceivable. The chassis 160 includes a side wall portion, which has a frame shape, and a bottom portion.

As illustrated in FIGS. 1 and 2, the light guide 120 has a rectangular parallelepiped shape in this embodiment. The light guide 120 is disposed so as to be separated from the LEDs 100 so that light emitted from the LEDs 100 is incident from side edge surfaces of the light guide 120. In this embodiment, circuit boards 110 are disposed on both sides of the light guide 120 in the longitudinal direction so as to be separated from each other. Multiple LEDs 100 are mounted on each circuit board 110.

The light guide 120 has incident surfaces 121, which are side edge surfaces located so as to face the multiple LEDs 100 and on which light emitted from the LEDs 100 is incident, and an emergent surface 122, which adjoins the incident surfaces 121. The light guide 120 causes light that has been incident from the incident surface 121 to be transmitted toward the inner side of the light guide 120, while causing the light to be totally reflected, and mainly emits the light from the emergent surface 122.

Figure 3:
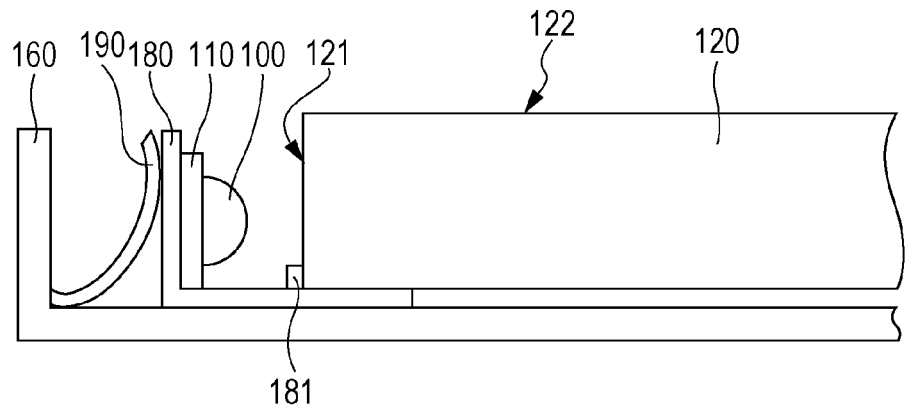
FIG. 3 is a side view of part of the backlight unit according to the embodiment when viewed in the direction of the arrow III in FIG. 2.

FIG. 3 is a side view of part of a backlight unit according to the embodiment when viewed in the direction of the arrow III in FIG. 2. FIG. 3 does not illustrate the reflection sheet 130 for simplicity.

As illustrated in FIG. 3, the backlight unit according to the embodiment includes the LEDs 100, which serve as the light sources, the light guide 120, gap retainers 180, the chassis 160, and springs 190, which serve as elastic bodies.

Each gap retainer 180 includes two plate-like portions that are perpendicular to each other so as to have an L-shaped cross section. The light guide 120 is placed over the first plate-like portion of each gap retainer 180. Each circuit board 110 on which multiple LEDs 100 are mounted is attached to a side of the second plate-like portion of the corresponding gap retainer 180. Each gap retainer 180 has a stopper 181 on an upper surface of the first plate-like portion.

In this embodiment, each gap retainer 180 is made of one metal sheet. The first plate-like portion and the second plate-like portion are formed by bending the metal sheet and the stopper 181 is formed by performing a drawing operation on the metal sheet. Stainless steel is used as a material of the gap retainers 180, but the material of the gap retainers 180 is not limited to this. Metals that are highly workable and that have high thermal-radiation efficiency can be used as the material of the gap retainers 180.

Each gap retainer 180 may be made of multiple components. For example, two metal sheets may be joined by welding and a block-like metal piece may be bonded to one of the metal sheets to form the stopper 181.

The side wall portion of the chassis 160 faces the second plate-like portion of each gap retainer 180. A bottom portion of the chassis 160 faces the first plate-like portion of each gap retainer 180. In this manner, the gap retainers 180 are positioned with respect to the chassis 160.

Each spring 190 is disposed between the side wall portion of the chassis 160 and the second plate-like portion of the corresponding gap retainer 180. In this embodiment, a first end of each spring 190 is joined to the side wall portion of the chassis 160. A second end of each spring 190 is in contact with the second plate-like portion of the corresponding gap retainer 180. Each spring 190 urges the corresponding gap retainer 180 in a direction away from the side wall portion of the chassis 160. Here, the first end of each spring 190 may be joined to the second plate-like portion of the corresponding gap retainer 180 and the second end of each spring 190 may be in contact with the side wall portion of the chassis 160.

In this embodiment, two gap retainers 180 are disposed so as to come into contact with two opposite incident surfaces 121 of the light guide 120. Each stopper 181 is thus constantly in contact with part of the corresponding incident surface 121 of the light guide 120 due to being pressed by the corresponding spring 190. Each stopper 181 has such a size as not to prevent the light emitted from the LEDs 100 from being incident on the corresponding incident surface 121 of the light guide 120.

Three or more gap retainers 180 may be disposed or one gap retainer 180 may be only disposed on one incident-surface-121 side of the light guide 120. In the case where one gap retainer 180 is only disposed on one incident-surface-121 side of the light guide 120, it is preferable that the position of the other incident surface 121 of the light guide 120 be fixed.

With the above-described configuration, the gap between each incident surface 121 of the light guide 120 and the corresponding LEDs 100 can be maintained.

Figure 4:
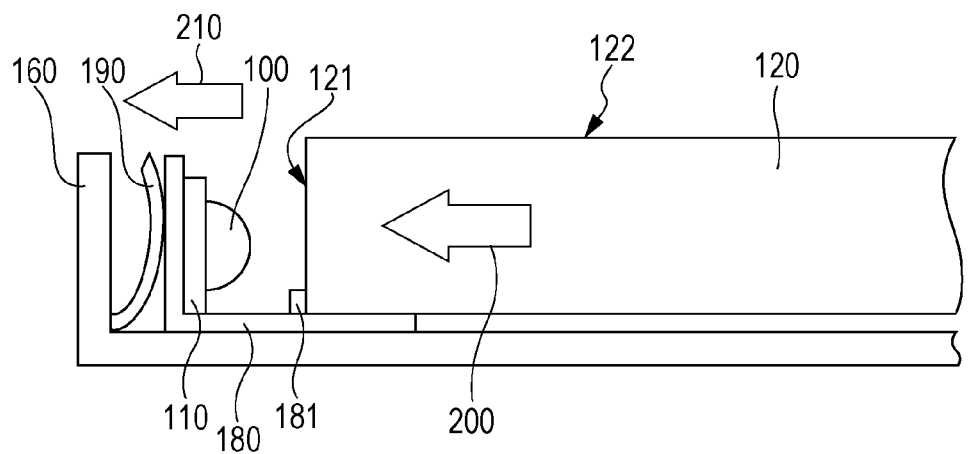
FIG. 4 is a side view of part of the backlight unit according to the first embodiment in which the light guide is in a thermally expanded state as a result of being heated.

FIG. 4 is a side view of part of the backlight unit according to the first embodiment in which the light guide is in a thermally expanded state as a result of being heated. As illustrated in FIG. 4, when the light guide 120 thermally expands after being heated with heat radiating from the LEDs 100 and other electronic components, the incident surface 121 of the light guide 120 moves in a direction of the arrow 200. The incident surface 121 moves farther as the light guide 120 increases in size, or, as the liquid crystal display device increases in size.

Since the incident surface 121 of the light guide 120 and the stopper 181 of the gap retainer 180 are in contact with each other, the gap retainer 180 moves by a distance equivalent to the distance that the incident surface 121 has moved in the direction indicated by the arrow 210. The spring 190 bends to an extent that corresponds to the distance that the gap retainer 180 has moved and thus the dimensional change of the light guide 120 due to thermal expansion is accommodated within the chassis 160.

In this manner, in the backlight unit according to the embodiment, the gap between each incident surface 121 of the light guide 120 and the corresponding LEDs 100 can be kept uniform even when the light guide 120 thermally expands. Thus, the light guide 120 and the LEDs 100 can be prevented from coming into contact with one another. Consequently, even a large liquid crystal display device including a large light guide 120 can stably emit light from the emergent surface 122 of the light guide 120 while the LEDs 100 are prevented from being damaged.

Hereinbelow, a backlight unit according to a second embodiment of the present invention will be described. The backlight unit according to the second embodiment differs from the backlight unit according to the first embodiment only in that the elastic bodies are rubber pieces. Thus, other part of the configuration will not be repeatedly described.

(Second Embodiment)

Figure 5:
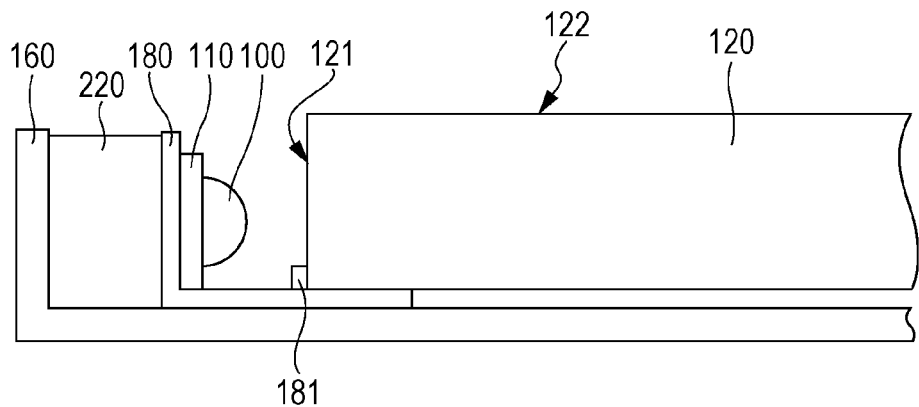
FIG. 5 is a side view of part of a backlight unit according to a second embodiment of the present invention when viewed in the direction of the arrow V in FIG. 2.

FIG. 5 is a side view of part of a backlight unit according to the second embodiment of the present invention when viewed in the direction of the arrow V in FIG. 2. FIG. 5 does not illustrate the reflection sheet 130 for simplicity.

As illustrated in FIG. 5, in the backlight unit according to the second embodiment of the present invention, rubber pieces 220 serve as elastic bodies. Each rubber piece 220 is disposed between the side wall portion of the chassis 160 and the second plate-like portion of the corresponding gap retainer 180. Although an acrylic resin with a high thermal-radiation efficiency is used as a material of the rubber pieces 220, the material of the rubber pieces 220 is not limited to the acrylic resin and may be any rubber material having elasticity.

In this embodiment, a first end of each rubber piece 220 is joined to the side wall portion of the chassis 160. A second end of each rubber piece 220 is in contact with the second plate-like portion of the corresponding gap retainer 180. Each rubber piece 220 urges the corresponding gap retainer 180 in a direction away from the side wall portion of the chassis 160. Here, the first end of each rubber piece 220 may be joined to the second plate-like portion of the corresponding gap retainer 180 and the second end of each rubber piece 220 may be in contact with the side wall portion of the chassis 160.

Figure 6:
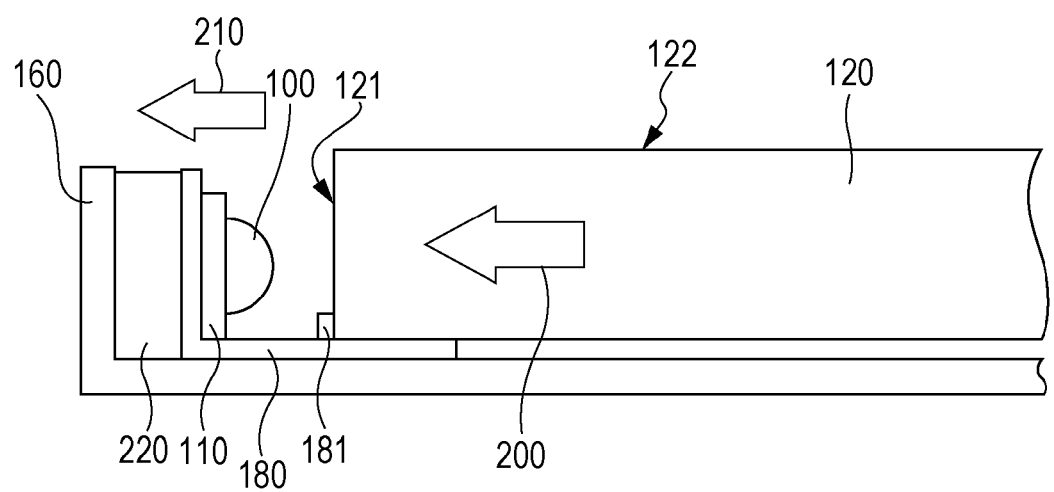
FIG. 6 is a side view of part of the backlight unit according to the second embodiment in which the light guide is in a thermally expanded state as a result of being heated.

FIG. 6 is a side view of part of the backlight unit according to the second embodiment in which the light guide is in a thermally expanded state as a result of being heated. As illustrated in FIG. 6, when the light guide 120 thermally expands after being heated with heat radiating from the LEDs 100 and other electronic components, the incident surface 121 of the light guide 120 moves in the direction indicated by the arrow 200.

Since the incident surface 121 of the light guide 120 and the stopper 181 of the gap retainer 180 are in contact with each other, the gap retainer 180 moves by a distance equivalent to the distance that the incident surface 121 has moved in the direction indicated by the arrow 210. The rubber piece 220 bends to an extent that corresponds to the distance that the gap retainer 180 has moved and thus the dimensional change of the light guide 120 due to thermal expansion is accommodated within the chassis 160.

In this manner, in the backlight unit according to the embodiment, the gap between each incident surface 121 of the light guide 120 and the corresponding LEDs 100 can be kept uniform even when the light guide 120 thermally expands. Thus, the light guide 120 and the LEDs 100 can be prevented from coming into contact with one another. Consequently, even a large liquid crystal display device including a large light guide 120 can stably emit light from the emergent surface 122 of the light guide 120 while the LEDs 100 are prevented from being damaged.

The embodiments disclosed herein are provided for illustration only and should not be construed as limiting the present invention in any way. The scope of the invention is defined not by the description provided above but by the scope of Claims and is intended to include concepts equivalent to the scope of Claims and all modifications within the scope of Claims.

REFERENCE SIGNS LIST 1 liquid crystal display device
100 LED
110 circuit board
120 light guide
121 incident surface
122 emergent surface
130 reflection sheet
140 group of multilayered sheets
150 liquid crystal display panel
160 chassis
170 bezel
180 gap retainer
181 stopper
190 spring
220 rubber piece

The invention claimed is:

1. A backlight unit comprising:
a light source;
a light guide disposed so as to be separated from the light source so that light from the light source is incident on a side edge surface of the light guide;
a plurality of gap retainers, each of which includes two plate-like portions orthogonal to each other so as to have an L-shaped cross section, the light guide being placed over a first plate-like portion of the two plate-like portions, the light source being attached to a side of a second plate-like portion of the two plate-like portions;
a chassis that includes a frame-shaped side wall portion and a bottom portion, the plurality of gap retainers being positioned with respect to the chassis such that the second plate-like portion and the side wall portion face each other and the first plate-like portion and the bottom portion face each other; and
an elastic body disposed between the side wall portion and the second plate-like portion, the elastic body urging the plurality of gap retainers in a direction away from the side wall portion, wherein
each of the plurality of gap retainers includes a stopper positioned on an upper surface of the first plate-like portion, the stopper being constantly in contact with a portion of the side edge surface of the light guide due to being pressed by the elastic body to maintain a gap between the light source and the side edge surface of the light guide; and the plurality of gap retainers are disposed so as to be in contact with two opposite side edge surfaces of the light guide.

2. The backlight unit according to claim 1, wherein the plurality of gap retainers are each made of one metal sheet.

3. The backlight unit according to claim 1, wherein the elastic body is a spring.

4. The backlight unit according to claim 1, wherein the elastic body is a rubber piece.

* * * * *